(12) United States Patent
Shannon et al.

(10) Patent No.: US 8,483,539 B2
(45) Date of Patent: Jul. 9, 2013

(54) DUMMY CONNECTOR FOR A FIBER OPTIC CABLE

(75) Inventors: Frank M. Shannon, Arnold, MD (US); Charles A. Rexrode, II, Hampstead, MD (US); Sean P. Andrews, Perry Hall, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/370,023

(22) Filed: Feb. 9, 2012

(65) Prior Publication Data

US 2012/0207436 A1 Aug. 16, 2012

Related U.S. Application Data

(63) Continuation of application No. 12/190,174, filed on Aug. 12, 2008, now Pat. No. 8,137,003.

(51) Int. Cl.
*G02B 6/00* (2006.01)
*G02B 6/36* (2006.01)

(52) U.S. Cl.
USPC .......................................... 385/139; 385/86

(58) Field of Classification Search
USPC ................................... 385/86, 139
See application file for complete search history.

(56) References Cited

U.S. PATENT DOCUMENTS

| | | | |
|---|---|---|---|
| 6,920,050 B2* | 7/2005 | Little et al. | 361/736 |
| 7,167,628 B2* | 1/2007 | Beck | 385/139 |
| 7,255,490 B2* | 8/2007 | Zhang et al. | 385/88 |
| 7,349,619 B2* | 3/2008 | Beck et al. | 385/139 |
| 7,352,948 B2* | 4/2008 | Beck | 385/139 |
| 7,390,203 B2* | 6/2008 | Murano et al. | 439/138 |
| 7,672,563 B2* | 3/2010 | Beck et al. | 385/139 |
| 7,756,383 B2* | 7/2010 | Beck | 385/139 |
| 7,899,300 B2* | 3/2011 | Wakileh et al. | 385/139 |
| 8,038,456 B1* | 10/2011 | Wang | 439/172 |
| 8,137,003 B2* | 3/2012 | Shannon et al. | 385/86 |
| 8,244,089 B2* | 8/2012 | Chen et al. | 385/134 |
| 2002/0064221 A1* | 5/2002 | Yeap et al. | 375/222 |
| 2003/0198026 A1* | 10/2003 | Bui | 361/728 |
| 2004/0066639 A1* | 4/2004 | Little et al. | 361/797 |
| 2004/0081196 A1* | 4/2004 | Elliott | 370/465 |
| 2004/0161958 A1* | 8/2004 | Togami et al. | 439/160 |
| 2004/0196642 A1* | 10/2004 | Aronson et al. | 361/818 |
| 2004/0252078 A1* | 12/2004 | Fischer et al. | 345/46 |
| 2005/0152701 A1* | 7/2005 | Liu et al. | 398/135 |
| 2005/0226626 A1* | 10/2005 | Zhang et al. | 398/135 |

(Continued)

FOREIGN PATENT DOCUMENTS

WO WO 2009031172 A1 * 3/2009

*Primary Examiner* — Rhonda Peace

(57) ABSTRACT

A device serving as a fiber optic cable dummy connector is provided. The device may have connection ports to accept the connectors terminating a fiber optic cable, such as LC-type connectors, or other configurations. The device may be used instead of an actual SFP module for connection of the fiber optic cable to a port on a piece of equipment. The device may be made opaque so that no transmission or receipt of data or light (laser) from the fiber optic cable may pass through the device. The device may be manufactured to be one-half the length of an actual SFP module. The device may be manufactured from any suitable material. The device may be used in place of using an actual SFP module. The dummy connector may be used in place of coiling fiber optic cables and leaving them unconnected until they are needed.

20 Claims, 4 Drawing Sheets

U.S. PATENT DOCUMENTS

2006/0002667 A1* 1/2006 Aronson .................. 385/93
2006/0127028 A1* 6/2006 Beck ..................... 385/139
2010/0310221 A1* 12/2010 Le Dissez ............... 385/135
2012/0014657 A1* 1/2012 Unser et al. ............. 385/139

* cited by examiner

# DUMMY CONNECTOR FOR A FIBER OPTIC CABLE

CROSS REFERENCE TO RELATED APPLICATION

The subject application is a Continuation Application of U.S. application Ser. No. 12/190,174, filed Aug. 12, 2008, which is hereby incorporated by reference in its entirety.

BACKGROUND INFORMATION

In certain instances, fiber optic cables may be installed prior to a piece of equipment being put into service or brought on-line. The fiber optic cables may be installed because the piece of equipment requires a fiber optic connection or a future piece of equipment may be installed which requires a fiber optic connection. The piece of equipment may have one or more ports that require a small form factor pluggable (SFP) module which may provide an interface for connection of the fiber optic cable or cables to the port.

The fiber optic cables, with an appropriate termination connector thereon, may be plugged into a first end of the SFP module. A second end of the SFP module may be then inserted into the port of the piece of equipment. The SFP module has electrical connectors on its second end for plugging into the port. The SFP module serves as a transceiver between the piece of equipment (via the port) and the fiber optic cables.

SFP modules may be used because they can be easily interchanged. This ease of interchange may facilitate the upgrade and maintenance of fiber optic networks. Rather than replacing an entire circuit board containing several soldered-in modules, a single SFP module can be removed and replaced for either repair or upgrading, or a combination of both. This may result in substantial cost savings, both in maintenance and upgrading efforts.

The fiber optic cables may also have been terminated with appropriate connectors, such as an LC-type connector. The fiber optic cables may have been terminated with connectors since the connectors are required to plug the fiber optic cables into the SFP module. The fiber optic cables are also typically terminated to protect the fiber ends of the fiber optic cables.

The SFP module typically may have two ports on its front face for insertion of the connector on the fiber optic cable. One port may be for transmit and the other port may be for receive. The two ports may support full duplex operation. An LC connector cannot be plugged directly into a port on the equipment that is configured to accept an SFP module. It is appreciated that the SFP module may have other configurations of ports.

In some cases, the fiber optic cables may be run to the piece of equipment but not terminated with connectors. In that case, the connectors are installed prior to need to connect the fiber optic cables.

Fiber optic cables may have been run to support all of the ports on the equipment, including active, inactive, and anticipated ports. Running all the required fiber optic cables at one time, even though they may not all be required at that present time, may be more cost effective for the fiber optic service provider.

Some of the fiber optic cables may be terminated and connected to the equipment via the port with an SFP module. There may also be fiber optic cables that may not be plugged into a port. The fiber optic cables may not be attached to the equipment right away for any number of reasons. The cables may not be attached because the various ports may not be ready for activation. Indeed, the activation of some or all of the ports may be delayed for various reasons, such as the piece of equipment is not fully operational. As a result, some of the fiber optic cables may not be connected to the piece of equipment. In some cases, the piece of equipment may not even be installed when the fiber optic cables are run. These unused fiber optic cables may need to be stored until they are required for use. As a result, the unused fiber optic cables may be coiled and hung from a hook near the equipment until the SFP module is available to insert into the port and connect the fiber optic cables thereon.

In some cases, the fiber optic cables may not be connected to the port on the piece of equipment because the SFP module or modules may not have been installed or purchased. Due to the potential expense of the SFP modules, they may not be purchased until they are required. Without the SFP module, the fiber optic cable may not be able to be connected to the port. The ports may therefore be left empty with no fiber optic cables connected thereon.

If not labeled properly, the fiber optic cables may become mixed up, such as a transmit cable and a receive cable being crossed. When a port is ready for activation and an SFP module is procured, an installer may have to conduct testing to determine the proper fiber optic cable or cables to connect to the port.

The unconnected fiber optic cables may be left on the floor or deck, wherein the cables may become a safety hazard since it may be possible for personnel to trip over them. Further, the fibers could become damaged if personnel step on them or equipment is placed upon them.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which.

Figure 1:
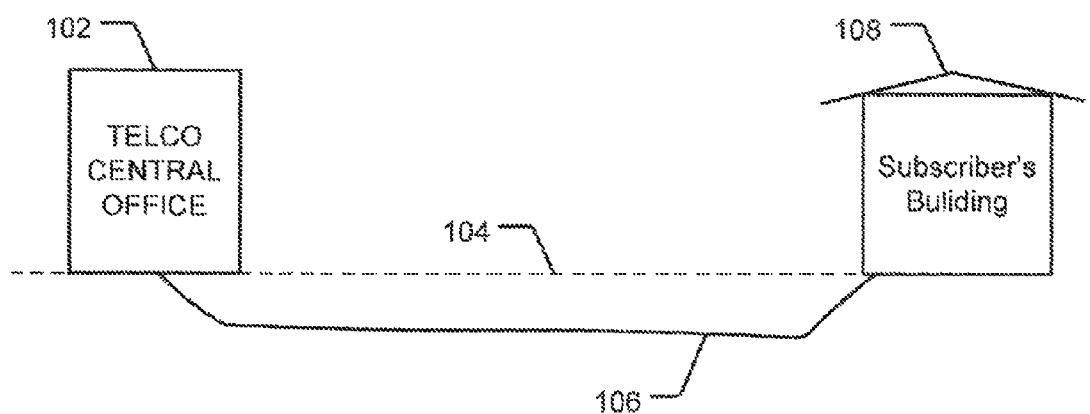
FIG. 1 depicts a basic network architecture of a fiber optic network in accordance with an exemplary embodiment.

These and other embodiments and advantages will become apparent from the following detailed description, taken in conjunction with the accompanying drawings, illustrating by way of example the principles of the various exemplary embodiments.

DETAILED DESCRIPTION OF PREFERRED EMBODIMENTS

Exemplary embodiments may provide an apparatus to serve as a connector for a fiber optic cable. Specifically, a device to serve as a dummy connector for termination of fiber optic cables.

The description below describes SFP modules. As used herein, the term "SFP module" may be understood to refer to an exemplary conventional type SFP module that is fully operational, i.e., live, and is capable of transmitting and receiving data while serving as an interface between a piece of equipment and a set of fiber optic cables via a port on the piece of equipment. An SFP module is to be distinguished from the SFP dummy connector of the embodiments described herein.

An apparatus in accordance with exemplary embodiments may provide an SFP dummy connector. The SFP dummy connector may allow unused fiber optic cables to be plugged into the SFP dummy connector which may then be inserted into a port on a piece of equipment.

The SFP dummy connector may protect the fiber optic cables by keeping fiber optic cables off of the floor and plugged into the port. This may eliminate risks to both personnel and equipment by preventing damage to the fiber optic cables. Personnel risks may be eliminated since the fiber optic cables are not on the floor wherein they may present a tripping hazard. Equipment risks may be eliminated since the fiber optic cables are off the floor and cannot be stepped upon or otherwise disturbed. Stepping upon the fiber optic cable or setting equipment upon the fiber optic cable may lead to damage to the fiber optic cable. If damaged, the fiber optic cable may not function properly.

A first end of the SFP dummy connector may have connection ports for the termination connectors of a fiber optic cable, such as an LC-type connection. Other connection ports may be included, such as VF-45 and MT-RJ which may accept those types of connectors. Two such connection ports may be included to fit a transmit and a receive cable. It should be appreciated that other port configurations may be implemented. The SFP dummy connector may have a length less than that of an SFP module, such as the length of the SFP dummy connector being one-half the length of an SFP module, which is about 2 inches in length. Therefore, the SFP dummy connector may be about 1 inch in length.

A second end of the SFP dummy connector may be configured to fit appropriately into the port which is designed to accept an SFP module. Therefore, the SFP module and the SFP dummy connector are interchangeable in the ports on the equipment. The SFP dummy connector may be replaced by an actual SFP module when needed, such as when the port on the piece of equipment is activated or needed for data transmission or the SFP module is procured. The SFP module may also be replaced by an SFP dummy connector if removal of the SFP module is required for maintenance or troubleshooting purposes.

The SFP dummy connector may block transmission of data through the connector. In other words, no electrical connectors may be provided on the second end to interface with the port and the first end may be opaque such that no light may pass to or from the fiber optic cables. The SFP dummy connector may therefore be inserted into an active port on a piece of equipment with a substantially reduced danger of an unintended connection or damage to the piece of equipment. Likewise, live fiber optic cables may be plugged into the SFP dummy connector with a substantially reduced danger of an unintended connection or damage to the piece of equipment.

The SFP dummy connector may be significantly less expensive than the SFP module because the SFP dummy connector is not fully operational, may be smaller, and may be made from less expensive materials.

The SFP dummy connector may be manufactured from various materials, such as, but not limited to, dense plastic, dense rubber, or soft metal, with appropriate connection devices for LC connectors. These materials can ensure that the SFP dummy connector is less expensive than a SFP module.

The SFP dummy connector may be approximately one-half the size of an SFP module. An SFP module may be over 2 inches long. In other words, approximately twice as long as the SFP dummy connector. The SFP dummy connector May be made in other sizes, including the same size as an SFP module.

The SFP dummy connector may be solid or opaque to prevent signals, such as light (laser), from passing through to or from the cables. The SFP dummy connector may have no electrical contacts on the rear face for interface with the port. Therefore, no conductive connections may be made with the equipment. The lack of conductive connections prevent signals from being transmitted from the equipment to the fiber optic cables and vice versa. In some embodiments, an insert may be used with the SFP dummy connector to prevent the transmission of signals from the fiber optic cables. Such an insert may be solid or opaque and be configured to fit into the SFP dummy connector.

Referring to FIG. 1, a basic network architecture of a fiber optic network 100 in accordance with an exemplary embodiment is illustrated. At one end of a fiber optic network 100 may be a fiber services end provider, such as a TELCO central office 102. At the other end of the fiber optic network 100 may be a fiber service subscriber, such as a subscriber's building 108. Typically, more than one fiber service subscriber may be connected to the TELCO central office 102. The subscriber 108 may be a single business or consumer, or may be a plurality of business or individual consumers. In this example, only one subscriber is shown for simplicity.

A fiber optic cable 106 may be run from the TELCO central office 102 to the subscriber's building 108. The depiction of the fiber optic cable 106 being run beneath the ground 104 is shown only for illustrative purposes; there may be alternative paths to run the fiber optic cable 106 from the TELCO central office 102 to the subscriber 108, such as running the fiber optic cable 106 above the surface of the ground 104. The fiber optic cable 106 is shown in FIG. 1 as a single cable for illustrative purposes only. The fiber optic cable 106 may consist of a plurality of fiber optic cables.

There may exist a plurality of optical devices, such as multiplexers, repeaters, splitters, switches, etc., along the cable 106 between the subscriber's building 108 and the TELCO central office 102. This plurality of optical devices, as well as other physical structures that may be along the fiber optic cable 106's path, are omitted from FIG. 1 for simplicity.

Figure 2:
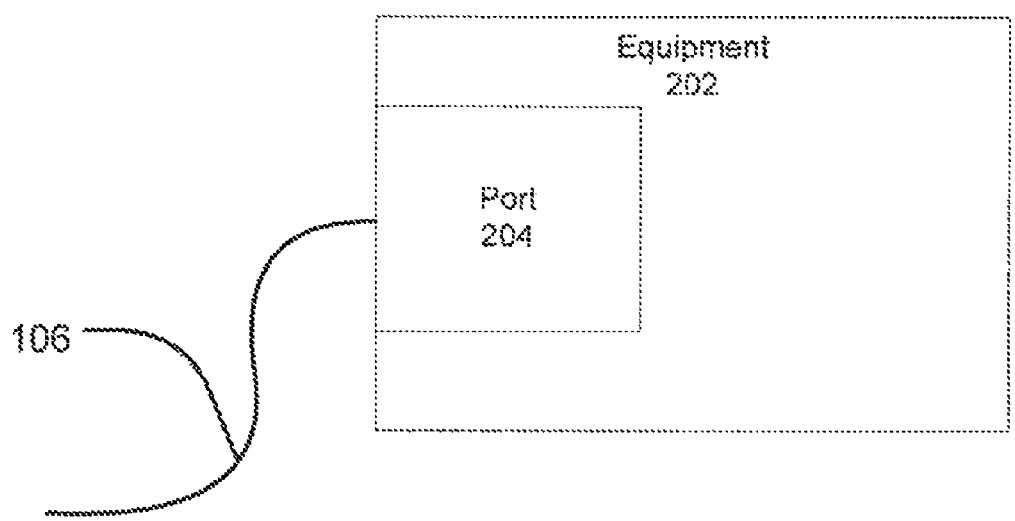
FIG. 2 depicts a block diagram of a fiber optic connection to a piece of equipment in accordance with an exemplary embodiment.

Referring now to FIG. 2, a block diagram of a fiber optic cable connection is depicted in accordance with an exemplary embodiment. The fiber optic cable 106 may be connected to a piece of equipment 202 through a port 204. A single port 204 is shown. It is appreciated that the equipment 202 may include of a plurality of ports for connection with one or more fiber optic cables 106. The fiber optic cable 106 may also have multiple fibers for terminating in a multiplicity of ports in equipment 202. The fiber optic cable 106 may have separate fiber terminations for transmit and receive.

The piece of equipment 202 may consist of any equipment that requires or utilizes a fiber optic connection to facilitate a path for the sending and receiving of data. For example, the piece of equipment 202 may be a network router or switch. It should be appreciated that the piece of equipment 202 may consist of any one many different types of equipment which have ports for SFP modules. The fiber optic cable 106 may provide a path for data transfer between the equipment 202 and the TELCO central office 102 through the port 204.

The port 204 may be physically attached to the equipment 202. The port 204 may be located in a separate location in other embodiments. The port 204 provides a physical connection point for the fiber optic cable 106 to interface with the equipment 202. In accordance with an exemplary embodiment, the port 204 may use an SFP connection. In other words, the port 204 may be configured to receive an SFP module or similarly configured modules.

Figure 3:
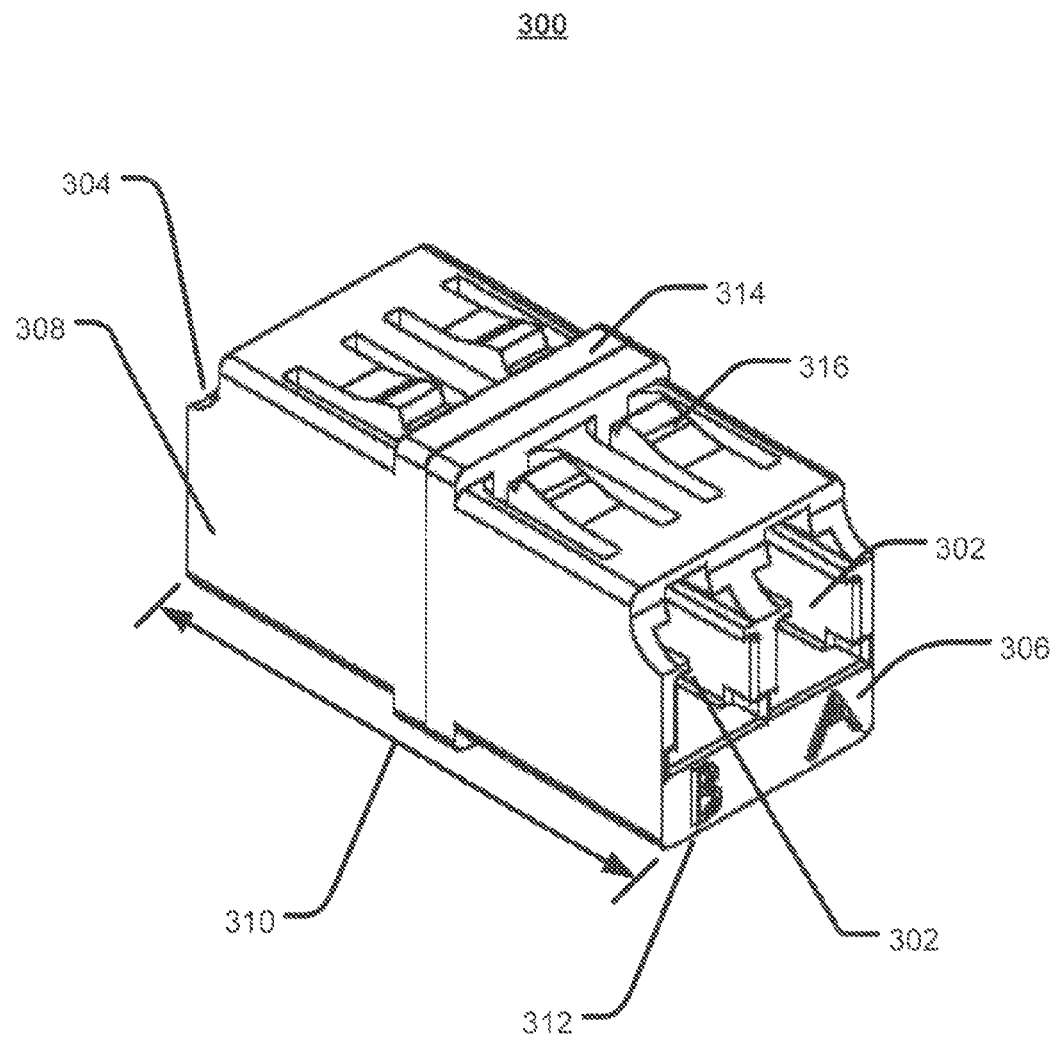
FIG. 3 depicts an SFP dummy connector in accordance with an exemplary embodiment.

FIG. 3 depicts a SFP dummy connector 300 in accordance with an exemplary embodiment. The SFP dummy connector 300 may have two connector ports 302 located on a first end 306. It should be appreciated that the SFP dummy connector may have more or less connector ports 302. The connector ports 302 may be configured to accept LC type connectors. It should be appreciated that the connector ports 302 may be configured to accept other types of connectors. Two connector ports 302 may be used since the fiber optic cables used are typically duplex in operation for transmit and receive. The purpose of the connector port 302 may be to provide a secure connection for the fiber optic cables, such as the fiber optic cable 106, into a port on the equipment, such as the port 204 on the equipment 202 of FIG. 2.

The SFP dummy connector 300 may be opaque, such that no light (laser) may pass from the fiber optic cable through the connector ports 302 to the second end 304 of the SFP dummy connector 300 and subsequently to the equipment 202 via the port 204. In other words, the SFP dummy connector blocks all light transmission to and from the fiber optic cable. For example, the connector port 302 may have no fiber optic cable contacts inside of it and have a solid backing at the distal end. In some embodiments, an insert (not shown) may be used with the SFP dummy connector to prevent the transmission of signals from the fiber optic cables. Such an insert may be solid or opaque and be configured to fit into the SFP dummy connector. The insert may be removable from the SFP dummy connector 300. The insert may be inserted into a cavity in the SFP dummy connector 300 at the distal end of the connector port 302.

The device 300 may have a second end 304. The second end 304 may be configured and dimensioned to fit into a port on a piece of equipment, such as the port 204. For example, the second end 304 may have the same dimensions as a second end an SFP module. The second end 304 may have no contacts for connection to the port 204. In other words, the SFP dummy connector 300 may have no actual electronic contacts on the second end 304. Therefore, no electrical signals may pass to or from the SFP dummy connector 300. For example, the equipment 202 may send signals to the port 204 but the signals will not propagate through the SFP dummy connector 300. Likewise, the fiber optic cable 106 connected to the connector port 302 may send signals but the signals will not propagate through the SFP dummy connector 300. The second end 304 may be dimensioned appropriately to fit into the port 204 in the same manner as an SFP module.

The connector ports 302 may be labeled. The first end 306 may have a space for labels. The labels may be used to annotate the function of the connector ports 302. For example, one port may be for transmit and the other port may be for receive. In the embodiment depicted in FIG. 3, the connector ports 302 are labeled "A" and "B." In other embodiments, other labels may be used on the first end 306, such as "T" and "R", "Transmit" and "Receive", or an in arrow and an out arrow. The labels on the first end 306 may be embossed during manufacturing, such as being stamped into the material of the SFP dummy connector 300, such as depicted in FIG. 3. The first end 306 may also provide a smooth area to which a label may be applied during use, such as an adhesive type label. The labeling of the ports on the SFP dummy connector 300 may allow an installer to keep track of the connections on the fiber optic cable 106. In other words, the transmit and receive cables may be kept from being mixed up.

The first end 306 and the second end 304 may be located at opposite ends of the SFP dummy connector 300. The first end 306 and the second end 304 may be separated by two side walls 308. The side walls 308 may have a length 310. The length 310 may be approximately one-half of the length of an SFP module. For example, the length 310 can be about one inch. In an exemplary embodiment of as depicted in FIG. 3, the SFP dummy connector 300 illustrated is about 1.25 inches long. In some embodiments, the length 310 may be the same length as a full-size SFP connector, such as about 2 inches. It should be appreciated that the SFP dummy connector 300 may be manufactured in other lengths. The other dimensions of the SFP dummy connector 300 may remain the same as an SFP module. This is to ensure that the SFP dummy connector 300 may be used in place of the full-size SFP module and will fit into the same port on the piece of equipment as the SFP module would.

The side walls 308 provide for the joining of a bottom section 312 to a top section 314. Further, the side walls 308 space apart connector ports 302 on the first end 306 from the second end 304. The bottom section 312 and the top section 314 may be contoured as shown in FIG. 3. It should be appreciated that the bottom section 312 and the top section 314 may be smooth, i.e., not contoured.

The top section 314 may also have one or more connection tabs 316 as depicted in FIG. 3. The connection tabs 316 may be used to lock the SFP dummy connector 300 into place within the port 204 in the same manner an SFP module may be locked into place. By pressing down on the connection tabs 316, the SFP dummy connector 300 may be unlocked and removed from the port 204. It should be appreciated that other connection means may be used to lock or secure the SFP dummy connector 300 to the ports 204 of the equipment.

The compatibility of the SFP dummy connector 300 with an SFP module configured port may enable a change between the SFP dummy connector 300 and an SFP module, if required. For example, the port 204 is set to be activated and an SFP dummy connector 300 is plugged into the port 204. The SFP dummy connected 300 may be unplugged and removed from the port 204 and the SFP module inserted into the port 204. The fiber optic cables plugged into the SFP dummy connector 300 may then be unplugged from the SFP dummy connector 300 and the fiber optic cables may then be inserted into the ports on the front of the SFP module. Alternatively, the SFP dummy connector 300 may be used to replace the SFP module for repair or maintenance. In this case, the reverse procedure is followed as just described. In other embodiments, if the SFP module is removed form the port 204, the SFP dummy connector 300 may be used in its place to keep the fiber optic cables connected in the right port and off of the ground, and as such, prevent damage to the fiber optic cables.

In some embodiments, the SFP dummy connector 300 may serve as a dust cap for fiber optic cables. In other words, the SFP dummy connector may be used as a cap over an LC connection of the fiber optic cable without being plugged into a piece of equipment.

Figure 4:
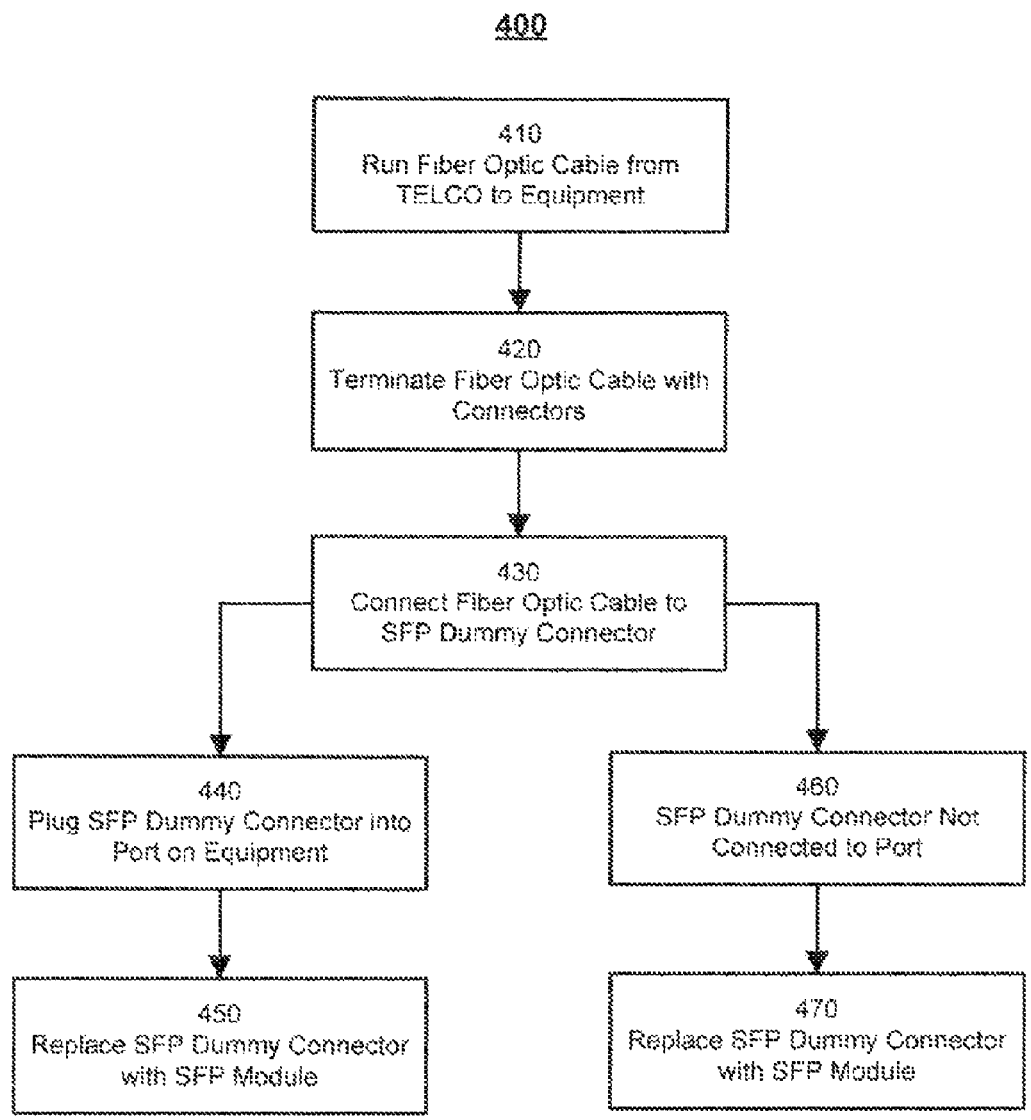
FIG. 4 depicts a flow chart of a method of using an SFP dummy connector in accordance with an exemplary embodiment.

An exemplary method for the use of the SFP dummy connector of an exemplary embodiment follows. Exemplary method 400 is provided by way of example, as there are a variety of ways to carry out the methods disclosed herein. FIGS. 1-3, and features thereof may be referred to. Each block shown in FIG. 4 represents one or more processes, methods, or subroutines carried out in the exemplary method 400. Referring to FIG. 4, the exemplary method 400 may begin at block 410.

At block 410, a fiber optic cable or a set of fiber optic cables may be run from a TELCO central office to a building of a fiber optic subscriber. For example, a fiber optic cable 106 may be run from the TELCO central office 102 to the subscriber's building 108, as depicted in FIG. 1.

At block 420, the fiber optic cable 106 may be terminated in an appropriate fiber optic connector. For example, an LC-type connector may be used to terminate the fiber optic cable 106. The fiber optic cable 106 may have a transmit and a receive cable to support duplex operation. It is appreciated that other connectors may be used to terminate the fiber optic cable. The connectors may be selected based upon the requirements of the SFP module used by the ports on the piece of equipment.

At block 430, the fiber optic cable or cables may be connected to the SFP dummy connector 300. Inside of the subscriber's building may be a piece of equipment, such as the equipment 202. The equipment 202 may have a port or multiple ports for a fiber optic connection, such as the port 204. The port 204 may require an SFP module. The SFP module may not have been acquired yet. The port 204 may also be inactive. For example, the equipment 202 may be newly acquired and the subscriber has not requested activation of the fiber optic connections. However, the TELCO central office 102 may have run the required fiber optic cables. Typically, in this situation, the fiber optic cable 106 would be coiled behind the equipment 202 until the port 204 is activated or an SFP module becomes available. The fiber optic cable 106 may also be left on the ground or floor near the equipment 202. The fiber optic cable 106 may or may not be labeled appropriately as to which port it is for, if multiple such ports are present.

An SFP dummy connector, such as the SFP dummy connector 300, may be available to provide a way to terminate the fiber optic cable 106. The fiber optic cable 106 may have a terminal connector installed, such as an LC-type connector. Typically, a fiber optic cable will have a terminal connector installed when it is run to a termination point in order to protect the fiber optic cable tips.

The fiber optic cable 106 may then be plugged into the LC connection ports 302 on the SFP dummy connector 300. The transmit cable may be plugged into the appropriately marked connection, such as the connector port 302 marked on the front face plate 306 with "A," as depicted in FIG. 3. The receive cable may be plugged into the appropriately marked connection, such as the connector port 302 marked on the front face plate 306 with "B." as depicted in FIG. 3

Continuing at block 440, the SFP dummy connector 300 may then be plugged into port 204 using the rear face connection 304. Alternatively, the SFP dummy connector 300 may be plugged into the port 204 first, that is prior to the insertion of fiber optic cables into the connector ports 302. Then the fiber optic cable may be plugged into connection ports 302. The SFP dummy connector 300 may be opaque so no light from the fiber optic cable 106 may pass, if the fiber optic cable 106 is a live cable. The SFP dummy connector 300 may also have no electrical contacts preventing any type of interface with the port 204.

At block 450, an SFP module may be acquired. The SFP dummy connector 300 can easily be swapped for the SFP module. For example the SFP dummy connector 300 may be removed from the port 204. The fiber optic cable 106 may be removed from the connector ports 302. The fiber optic cable 106 may then be plugged into the connector ports on the SFP module. The SFP module may then be inserted into the port 204. Alternatively, the SFP module may be inserted into the port 204 prior to the connection of the fiber optic cable 106.

Alternatively, at block 460, the SFP dummy connector 300 may not be connected to the port 204. That is the fiber optic cable 106 may be coiled and hung behind the equipment 202. It should be appreciated that that fiber optic cable 106 may be stored in alternative manners, such as being coiled and placed beneath a false floor. The SFP dummy connector 300 may serve in this case as a protector for the termination connection the fiber optic cable. The SFP dummy connector may serve as a dust cap for the fiber optic cable 106. Further, by plugging the fiber optic cable 106 into the SFP dummy connector, the transmit and receive cables may be kept from being mixed up.

At block 470, the SFP dummy connector 300 may be replaced with the SFP module. The SFP dummy connector 300 may then be removed from the fiber optic cable. That is, the fiber optic cable 106 connectors, such as an LC connector, may be removed from the connector 302. The fiber optic cable 106 may then be plugged into the SFP module. The SFP module may be inserted into the port on the equipment, such as port 204 on equipment 202. Alternatively, the SFP module may be inserted into the port 204 and then the fiber optic cable 106 may be plugged therein.

In the preceding specification, various exemplary embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. An fiber optic cable connection device, comprising:
a first end comprising at least one connection port configured for receiving a termination connector of a fiber optic cable; and
a second end configured for insertion into a port of a piece of equipment;
wherein the first end and the second end are positioned at opposite ends of the device and the device is configured to block the propagation of signals, wherein the first end further comprises an opaque stationary material configured to substantially block light from passing to or from a fiber optic cable, wherein the device is configured to be interchangeable with a small form factor pluggable (SFP) module, wherein the device has a length of no more than one-half the length of an SFP module.

2. The device of claim 1, wherein the first end comprises two connection ports.

3. The device of claim 2, wherein the two connection ports are positioned side by side on the first end of the device.

4. The device of claim 2, wherein the at least two connection ports comprise indicators indicating at least a transmit port and a receive port.

5. The device of claim 4, wherein the indicators are embossed permanently on the device.

6. The device of claim 4, wherein the indicators are removable.

7. The device of claim 1, wherein the at least one connection port is configured to receive a termination connector comprising at least one of an LC-type connector, a VF-45 connector and a MT-RJ connector.

8. The device of claim 1, wherein the device has a length of one-half the length of an SFP module.

9. The device of claim 1, wherein the device has a length of about 1.25 inches.

10. The device of claim 1, wherein the device is comprised of at least one material from a group comprising plastic, rubber, and metal.

11. The device of claim 1, wherein the second end is configured for insertion into a port configured to receive an SFP type module.

12. A method, comprising the steps of:
terminating at least one fiber optic cable with a corresponding termination connector; and
plugging the at least one termination connector into one or more connection ports positioned at a first end of a device, the device comprising a second end, opposite the first end, with the second end configured to be inserted into a port of a piece of equipment and the device blocks signals from the one or more fiber optic cables, wherein the first end further comprises an opaque stationary material configured to substantially block light from passing to or from a fiber optic cable, wherein the device is configured to be interchangeable with a small form factor pluggable (SFP) module, wherein the device has a length of no more than one-half the length of an SFP module.

13. The method of claim 12, wherein the connector is comprised of at least one of a LC-type connector, a VF-45 type connector, and a MT-RJ type connector.

14. The method of claim 12, wherein the device has a length of about 1.25 inches.

15. The method of claim 12, further comprising inserting the second end of the device into a port of a piece of equipment.

16. The method of claim 12, wherein the port of the piece of equipment is configured to receive an SFP module.

17. The method of claim 12, further comprising the steps of:
terminating a second fiber optic cable with a second connector wherein the second connector is of a same type as the first connector; and
plugging the second connector into a connection port located at the first end of the device.

18. The method of claim 17, further comprising labeling the two ports positioned at the first end of the device.

19. The method of claim 17, further comprising inserting the second end of the device into a port of a piece of equipment.

20. The method of claim 19, wherein the port of the piece of equipment is configured to receive an SFP module.

* * * * *